Nov. 22, 1966 V. W. BOLIE 3,287,638

METHOD OF COUNTING ERYTHROCYTER UTILIZING HIGH FREQUENCY CURRENT

Filed Oct. 2, 1962

Inventor
Victor W. Bolie
by Dawson, Tilton, Fallon, Lungmus & Alexander Attys

United States Patent Office 3,287,638
Patented Nov. 22, 1966

3,287,638

METHOD OF COUNTING ERYTHROCYTES UTILIZING HIGH FREQUENCY CURRENT

Victor W. Bolie, Ames, Iowa, assignor to Iowa State University Research Foundation, Inc., Ames, Iowa, a corporation of Iowa Filed Oct. 2, 1962, Ser. No. 227,796
1 Claim. (Cl. 324—71)

This invention relates to an erythrocyte counter, and, more particularly, to counting apparatus employing electrical excitation.

It is a principal object of this invention to provide a method which employs an electronic cell-counter which is characterized by a high degree of reliability and accuracy. The invention utilizes impedance principles of biological tissues and physiologically important electrolytes which are substantially free of polarization artifacts.

Another object of the invention is to utilize a counting apparatus employing electrically excited inert electrodes wherein the excitation frequency is above 10 kcs. whereby undesirable polarization characteristics are avoided.

Other objects and advantages of the invention may be seen in the details of construction and operation set down in this specification.

The invention will be explained in conjunction with an illustrative embodiment in the accompanying drawing, in which—

Figure 1:
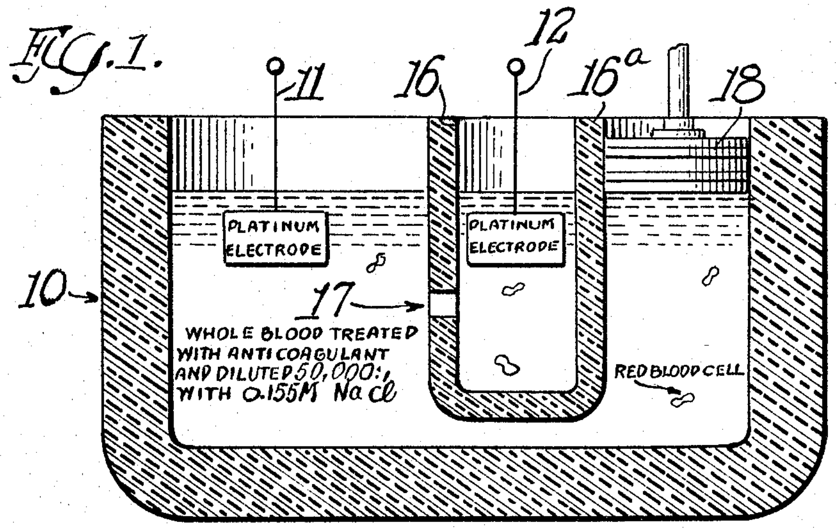
Figure 2:
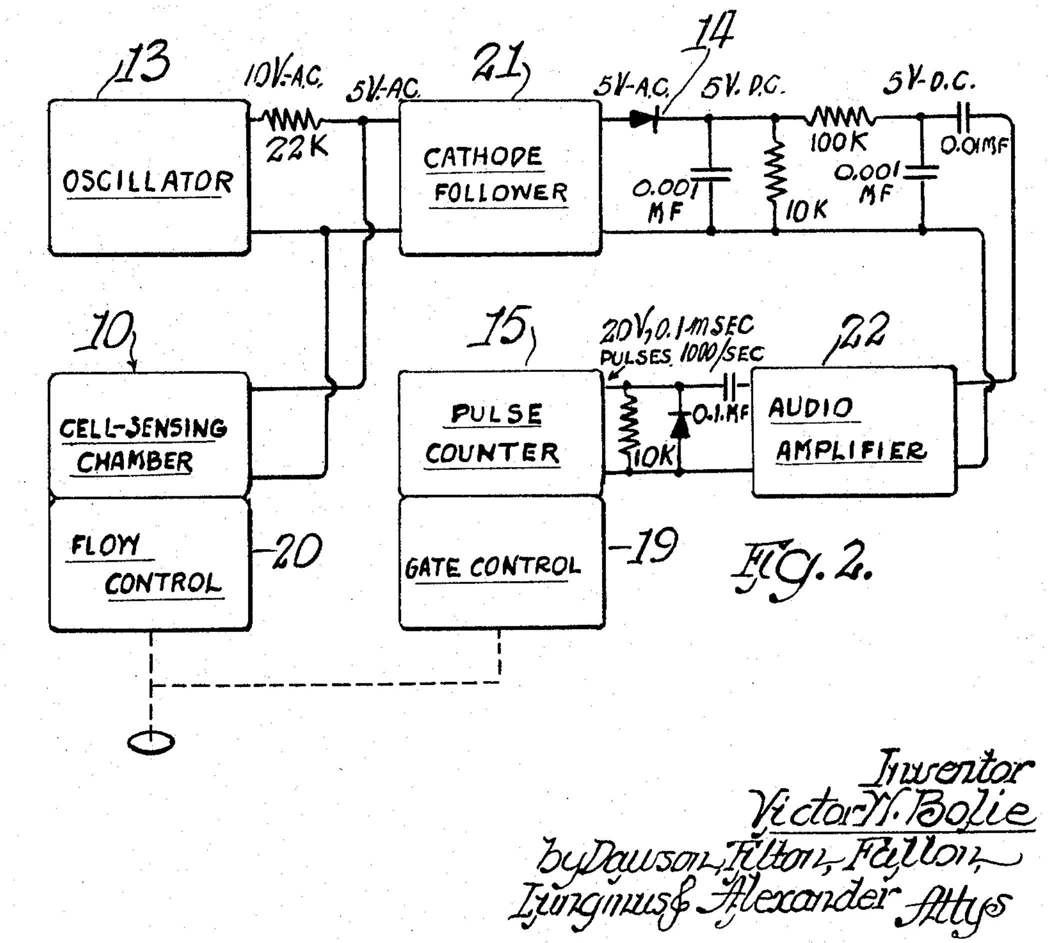

FIG. 1 is an elevational view, partially in section, with other parts schematically depicted, of the cell portion of the counting apparatus; and FIG. 2 is a schematic diagram of the circuitry and elements employed in the erythrocyte counter.

Referring first to FIG. 2, the numeral 10 designates generally a cell-sensing chamber which is seen in greater particularity in FIG. 1. The chamber 10 is equipped with a pair of platinum electrodes 11 and 12 (see FIG. 1), which are coupled to an oscillator 13. Arranged in parallel with the cell-sensing chamber is a pulse-forming circuit generally designated 14, including a pulse counter 15.

The electrodes are separated by a barrier 16 equipped with an aperture 17. The chamber is also equipped with means in the form of a piston 18 for developing pressure within the chamber 10 so as to cause fluid flow through the aperture 17.

Under these circumstances, red blood cells flow through the aperture 17 and thus change the impedance between the platinum electrodes 11 and 12. When an erythrocyte is present in the aperture 17, the increased impedance results in the formation of a pulse in the pulse-forming circuit 14 which is sensed by the pulse counter 15. Through the use of a gate control 19 and a flow control 20, the time of sensing can be controlled so that the number of erythrocytes present in a given solution can be determined.

It is believed that a more detailed specific example and explanation of the invention will aid in the understanding thereof. For that purpose, the following is set down.

*Impedance of 100 x 100 micron aperture at 100 kcs.*

At 100 kcs., the effects of electrode polarization may be neglected, and the dielectric displacement current through the water is small. The resistivity of 0.155 M NaCl (isotonic saline) is approximately 200 ohm-centimeters. Hence, the impedance of a 100 x 100 x 100 micron aperture at 100 kcs. in isotonic saline is close to a pure resistance of $(200)(0.01)/(0.01)^2=20{,}000$ ohms. If desired, the saline may contain the usual anticoagulants, i.e., heparin, etc.

*Impedance effect of an erythrocyte in the aperture*

The erythrocyte volume may be considered equivalent to a cube 4.2 x 4.2 x 4.2 microns in size. The saline displaced by this volume has a face-to-opposite-face resistance of $(200)(4.2\times10^{-4})/4.2\times10^{-4})^2=475{,}000$ ohms, while a 4.2-micron-thick slice across the 100 x 100 micron aperture has a resistance of $$(200)(4.2\times10^{-4}/(100\times10^{-4})^2=840 \text{ ohms}$$

Consider the extreme case of a zero equivalent conductivity for the red blood cell. In this case, the face-to-face conductance of the 4.2 micron slice across the 100 x 100 micron aperture is decreased by only $$100\times(840/475{,}000)=0.177 \text{ percent}$$

by the presence of the erythrocyte. There are 100/4.2 =23.8 such slices in the volume of the whole aperture. One of these slices contains the erythrocyte and therefore has its resistance increased at most by 0.177 percent. Hence the presence of the red blood cell in the aperture increases the aperture impedance from $23.8\times840=20{,}000$ ohms to no more than $$(23.8-1)(840)+(1)(840+0.0177\times840)$$
$$-20{,}000+(1.77)(8.4)=20{,}000+14.9 \text{ ohms}$$

The net result is that the entry of a 74-cubic-micron erythrocyte into a 100 x 100 x 100 micron aperture filled with 0.155-molar aqueous sodium chloride increases the aperture impedance of 20,000 ohms by no more than 0.075 percent.

*Minimum dilution factor*

No more than one cell at a time should be in the 100 x 100 x 100 micron aperture. This requires an average volume per cell of $(100)^3=10^6$ cubic microns$=10^{-3}$ cubic millimeter, or a diluted cell-density of 1000 cells/mm.$^3$. The erythrocyte density in whole blood is approximately $5\times10^6$ cells/mm.$^3$. Hence, the dilution factor for a 100 x 100 x 100 micron aperture should not be less than $(5\times10^6)/10^3=5000$. A dilution factor of 50,000 ensures a low probability of more than one cell in the aperture at a time.

*Required pressure head*

The 100 x 100 x 100 micron aperture forms a saline passageway which may be approximated by a cylindrical tube length $l=100\mu$ and radius $r=100/\sqrt{\pi}=56.3\mu$. If, with a dilution factor of 50,000 a total erythrocyte count of about 100,000 is to be registered within a time interval of 100 seconds, the required volume flow rate through the aperture will be $Q=0.01$ cm.$^3$/sec. The viscosity of water at 37 degrees centigrade is $\eta=0.6947$ centipoise $=6.947\times10^{-3}$ dyne-seconds/centimeter$^2$. The differential pressure head $p$ required across the aperture is then found from the standard formula $p=\eta(8l/\pi r^4)Q$ to be $$p=(6.947\times10^{-3})(2.27\times10^7)(0.01)=1580 \text{ dynes/cm.}^2$$
$$=1.56\times10^{-3} \text{ atm.}=1.19 \text{ mm. Hg}=1.6 \text{ cm. } H_2O$$

Due to the inverse fourth-power dependence, a reduction of the aperture diameter by 50% (from $100\mu$ to $50\mu$) will raise the required pressure head by a factor of 16 to the rather high value of 25.6 cm. $H_2O$.

*Transit rate and dwell time*

A volume flow rate of 0.01 cm.$^3$/sec. through the 100 x 100 x 100 aperture gives a flow velocity of $$(10 \text{ mm.}^3/\text{sec.})/(0.1 \text{ mm.})^2=1000 \text{ mm./sec.}$$

so that the transit time required for the erythrocyte to traverse the $100\mu$-long passageway is $$(0.1 \text{ mm.})/(1000 \text{ mm./sec.})=10^{-4} \text{ sec.}=0.1 \text{ millisecond}$$

The total cell count of about 100,000 registered during the time interval of 100 seconds gives a transit repetition rate of 1000 cells/second, or a transit repetition period of 0.001 sec.=1.0 millisecond.

*Summary of specifications*

Based on the foregoing, the following optimum specifications are indicated:

Whole blood dilution: 50,000 to 1 with 0.155 M NaCl
Aperture size: approximately 0.1 x 0.1 x 0.1 mm.
Required pressure head: at least 1.6 cm. $H_2O$
Volume flow rate through aperture: 0.01 ml./sec.
Cell transit rate: approximately 1000 cells/sec.
Cell transit time: approximately 0.1 millisecond
Aperture impedance at 100 kcs.: 20,000 ohms resistive
Maximum impedance rise in transit: about 10 ohms.

The cell 10 is advantageously constructed of glass, with the barrier 16 being provided as part of an inner chamber 16*a*, also constructed of glass.

The pulse counter and start-stop gate control seen in FIG. 2 can conveniently be provided in the form of a Hewlett-Packard 5211A electronic counter, which includes both a remote gate control and counter in a single unit. The oscillator 13 may be any generator capable of producing an output signal capable of 10 volts at 100 kcs.; such as a Model 200 CD oscillator (5 c.p.s. to 600 kcs. (6 bands) 10 v. to 600 ohms 160 mw. output 20 v. open circuit), available from the Hewlett-Packard Company, Palo Alto, California.

Also included in the pulse-forming circuit 14 is a cathode follower 21 and an audio amplifier 22 (rated at 2–20,000 c.p.s. for a one-megohm input with a voltage gain of 10,000). Other suitable circuit elements are provided as indicated on the schematic diagram provided as FIG. 2 hereof.

While in the foregoing specification a detailed description of an embodiment of the invention has been set down for the purpose of illustration thereof, many variations in the details herein given may be made by those skilled in the art without departing from the spirit and scope of the invention.

I claim:

In a method for counting erythrocytes, the steps of diluting blood to about 50,000 to 1 with anti-coagulated treated isotonic saline to provide a solution of erythrocytes of known impedance, flowing said solution with the erythrocytes contained therein from the region of one electrode to another electrode through an aperture having an area of the order of $10^{-2}$ square millimeters at a flow rate of the order of 0.01 milliliter per second while applying an electrical excitation to said electrodes of the order of 100 kcs., sensing the impedance variation between the electrodes, developing a pulse for each increase in impedance, and counting said pulses.

References Cited by the Examiner

UNITED STATES PATENTS

| | | | |
|---|---|---|---|
| 2,656,508 | 10/1953 | Coulter | 324—71 |
| 2,661,734 | 12/1953 | Holzer et al. | 324—65 X |
| 2,869,078 | 1/1959 | Coulter et al. | 324—71 |
| 3,122,431 | 2/1964 | Coulter et al. | 324—71 X |

OTHER REFERENCES

American Journal of Clinical Pathology; vol. 34; September 1960, pp. 203–213.

Lind et al., Journal of Physical Chemistry, June 1961, pp. 999–1004; p. 1000 relied on.

Magath et al., "Electronic Blood-Cell Counting."

Mattern et al., "Determination of Number and Size of Particles by Electrical Gating: Blood Cells." Journal of Applied Physiology; vol. 10; January 1957, pp. 56–70.

Okada et al., "An Electrical Method to Determine Hematocrits," IRE Transactions on Medical Electronics," vol. ME–7, No. 3, July 1960, pp. 188–192.

WALTER L. CARLSON, *Primary Examiner.*

FREDERICK M. STRADER, *Examiner.*

C. F. ROBERTS, *Assistant Examiner.*